United States Patent Office 2,812,257
Patented Nov. 5, 1957

2,812,257

INSERT FOR DRINKING STRAWS AND METHOD OF MAKING THE SAME

Martin D. Scisorek, Los Angeles, Calif.

No Drawing. Application May 2, 1955,
Serial No. 505,507

15 Claims. (Cl. 99—138)

The present invention relates to a flavoring composition for beverages, and particularly to a composition for insertion into beverage drinking straws for the purpose of supplying flavor to the beverage as it passes through the drinking straw.

The provision and maintenance of a variety of beverage flavoring compositions at confectionery counters poses a serious problem. A large amount of precious space is required and expensive storage and dispensing equipment is needed. In addition, there is the problem of keeping the storage and dispensing equipment clean and sanitary, and of preventing contamination or spoilage of the stored or stocked flavoring compositions.

Accordingly, it is an important object of my invention to provide a concentrated flavoring composition for beverages in a dry, stable form adapted for insertion into beverage drinking straws.

Another object is to provide a flavoring composition impregnated on an insoluble material adapted for insertion into beverage drinking straws and for uniform solution in a beverage as it is drawn through the straw by the beverage consumer.

A further object is to provide a beverage drinking straw insertion impregnated with a dry, concentrated flavoring composition capable of dissolving at a uniformly slow rate in a stream of a beverage passed through a straw containing the insert.

Additional objects will become apparent from the following description.

Broadly stated, the flavoring composition of my invention comprises a stiffening agent and a flavoring material of predetermined amounts and portions and of relative solubilities designed to impart the desired flavor to a particular type of beverage as it streams over the flavoring composition. The flavoring composition preferably is impregnated on an insert, preferably in the form of a strip of absorbent flexible material, adapted for inserting into a beverage drinking straw.

For example, in a specific embodiment of the invention, a strip of cotton linter paper board is impregnated with a specific flavoring composition in accordance with the following specific procedure. A piece of paper board about 19 inches long and about 4.5 inches wide is procured. The board is dipped into a body of molten paraffin wax to a depth of about 1/16 inch at each of its 19-inch long sides. The edge strips of absorbed wax are permitted to cool and seal the linters in the sides of the board. The resulting wax seal protects the ends of the completed insert strip against unraveling during subsequent use in the beverage straw. The thus sealed piece of paper board is impregnated with the flavoring composition as follows.

A specific chocolate flavored composition is prepared by mixing about 3.3 grams (about 13 percent) of calcium saccharin sweetening agent, about 3 cubic centimeters of synthetic chocolate flavoring compound, (about 12 percent) about 3 cubic centimeters of chocolate extract (about 12 percent), about 7 grams (about 30 percent) of chocolate brown shade (about 90 to 100 percent color dye F. D. & C.), about 5 grams (about 20 percent) corn starch, and about 45 cubic centimeters of water. The percent figures given in parentheses are percent by weight of the dry mixture before adding water. The paper board with sealed edges is dipped into the resulting liquid mixture, the excess of liquid is permitted to drain off and the dipped board is dried in a heated air atmosphere. The dried board is cut to produce 80 impregnated strips each about 4.5 inches long and about 7/32 inch wide.

This has been found to be the proper size for tightly inserting into a standard 7/32 inch inside diameter straw. The straw can be made of waxed paper, glass, plastic, or any other suitable material. Straws of larger or smaller inside diameter are fitted with strips of correspondingly larger or smaller widths, respectively.

Instead of cotton linter paper board, blotting paper or other inexpensive absorptive materials in sheet or board form can be used.

A specific strawberry flavoring composition for impregnating the paper board is prepared by mixing about 3.3 grams (about 16 percent) of calcium saccharin sweetening agent, about 2 cubic centimeters (about 10 percent) of synthetic strawberry base flavoring compound, about 3 cubic centimeters (about 5 percent) of synthetic vanilla flavoring compound of about 30 × strength (thirty times that of natural extract of vanilla), about 6 grams (about 30 percent) of amaranth red #2 dye (F. D. & C.), about 5 grams (about 25 percent) corn starch, and about 45 cubic centimeters of water. The percent figures given in parentheses are percent by weight of the dry mixture before adding water.

Instead of calcium saccharin sweetening agent, other sweetening agents such as saccharin, sodium saccharin, calcium cyclamate, sodium cyclamate and sugars can be used in amounts having approximately the same sweetening power exhibited by about 5 grams of calcium saccharin. In general, on a dry basis, the dry flavoring composition, that is, after the water content has been evaporated therefrom, should contain preferably about 10 to about 25 percent by weight of calcium or sodium saccharin or approximately equivalent amounts of substituted sweetening agents such as 10 percent saccharin or 60 percent sodium or calcium cyclamate, for example.

The amount of synthetic chocolate flavoring compound and of chocolate extract in the chocolate flavored composition given above is preferably about 10 to about 15 percent by weight on the dry basis in each case. Optionally, the chocolate extract can be omitted from this chocolate composition by using double the amount of synthetic chocolate flavoring compound, that is, preferably about 25 percent by weight. Similarly, in the case of the strawberry flavoring composition given above, the synthetic strawberry base flavoring compound content is preferably about 7 to about 15 percent by weight on the dry basis and that of the synthetic vanilla flavoring compound is preferably about 10 to about 20 percent. Use of the vanilla flavoring with the strawberry flavoring produces a sweeter flavor, but the vanilla can be omitted from the formula and preferably about 20 percent synthetic base flavoring compound can be used instead of the strawberry and vanilla flavors together.

Instead of synthetic flavoring compounds, extracts of natural flavors can be used in the impregnating composition. In general, the natural flavoring materials do not have as great a flavoring power as the synthetic flavoring materials, and larger amounts of the former are required to achieve equally satisfactory results. Whereas preferably about 5 to about 30 percent by weight of natural flavoring compound in the dry composition generally is satisfactory, preferably about 10 to about 60 percent of the natural flavor extract is generally used for good results. In addition to the chocolate and strawberry flavors exemplified above, any desired flavor or combination of flavors, such as peach, raspberry, blackberry, banana, cherry, orange, lemon and lime, to name only a few, can be used in the impregnation composition.

It is usually desirable to include a suitable food dye or coloring agent in the impregnation composition, as shown in the case of the chocolate and strawberry compositions described above. Preferably about 20 to about 35 percent by weight of the dye is used. The dye colors the liquid or beverage during its passage through the straw and also colors the beverage in the drinking container by diffusion from the strip and through colored liquid returned to the container from the straw. The dye may, however, be omitted from the impregnation composition, if desired.

Corn starch was included in the chocolate and in the strawberry impregnation compositions above to stiffen the cotton linter paper board. About 15 to about 30 percent by weight of the dry composition, preferably about 20 to about 25 percent, has been found to satisfactorily stiffen the board for cutting operations and to stiffen the strip for ready insertion into the straw. The corn starch also acts to retard the rate of solution of the flavoring composition in the beverage stream and aids in establishing and maintaining a uniform rate of solution. Instead of corn starch, equivalent amounts of other stiffening agents such as flour, gluten, dextrin, corn sugar and the like, can be used. The stiffening agent preferably is one having a carbonhydrate molecular structure.

The paraffin wax seal at the ends of the inserted strip is insoluble in the beverage and prevents opening or unraveling of these ends. Unraveling of the ends of the strip during use would tend to plug the straw and interfere with the passage of liquid through the straw.

The beverage drinking straws containing the flavoring composition impregnated strips can be conveniently and safely stored or stocked. They require very little storage space and no dispensing equipment. Furthermore, their use does not present a cleanliness, sanitation or spoilage problem. They can be used with all sorts of beverages such as hot or cold milk, carbonated water, plain water, or any other drink or beverage. The chocolate and the strawberry flavoring compositions described above are particularly designed for milk drinks.

While my invention has been described above in connection with specific examples, it will be understood that this has been done by way of illustration only, and not with the intention of limiting the scope of the invention. It will be apparent to one skilled in the art that many modifications and variations can be made in the illustrative examples in the practice of the invention. Accordingly, it is understood that such modifications and variations in the illustrative material given above may be made within the scope of the appended claims without departing from the spirit of the invention.

What I claim is:

1. An insert adapted for insertion into a drinking straw comprising a flat strip of absorptive flexible material impregnated with a composition comprising a flavoring material and a stiffening agent, the amount of the stiffening material being sufficient to substantially increase the stiffness of the flexible material.

2. An insert as defined in claim 1 in which the impregnating composition also includes a sweetening agent and a coloring agent.

3. An insert adapted for insertion into a drinking straw comprising a flat strip of absorptive material having the pores at its ends only closed by a water-insoluble sealing material, the strip being impregnated between said sealed ends with a composition comprising a flavoring material.

4. An insert as defined in claim 3 in which the absorptive material is cotton linters.

5. An insert as defined in claim 3 in which the sealing material is paraffin wax.

6. An insert as defined in claim 3 in which the entire body of the strip between its sealed ends is impregnated with the impregnating composition.

7. An insert as defined in claim 3 in which the impregnating composition also includes a stiffening material.

8. An insert as defined in claim 7 in which the impregnating composition also includes a sweetening agent and a coloring agent.

9. The method of making an insert for insertion into a drinking straw which comprises closing the pores of the ends only of a flat porous strip of absorptive flexible material with a water-insoluble sealing compound, and impregnating the strip between the sealed ends with a composition comprising a flavoring material.

10. The method defined in claim 9 in which the absorptive material is cotton linters.

11. The method defined in claim 9 in which the entire body of the strip between the sealed ends is impregnated with the composition comprising the flavoring material.

12. The method defined in claim 9 in which the strip with the pores at the ends sealed is dipped into an aqueous mixture of the impregnating composition.

13. The method defined in claim 9 in which the material for sealing the pores at the ends of the strip of absorptive material is paraffin wax.

14. The method defined in claim 9 in which the impregnating material includes a stiffening agent.

15. The method defined in claim 14 in which the impregnating material also includes a sweetening agent and a coloring agent.

References Cited in the file of this patent

UNITED STATES PATENTS

| 1,254,115 | Brand | Jan. 22, 1918 |
| 1,996,203 | Hollingsworth | Apr. 2, 1935 |
| 2,109,920 | Savage | Dec. 21, 1937 |
| 2,116,310 | Harvey | May 3, 1938 |
| 2,128,448 | Wright | Aug. 30, 1938 |
| 2,306,399 | Menzel | Dec. 29, 1942 |
| 2,357,258 | Harris | Aug. 29, 1944 |
| 2,653,105 | Gordon | Sept. 22, 1953 |

FOREIGN PATENTS

| 27,191 | Great Britain | 1898 |
| 9,623 | Great Britain | 1905 |

OTHER REFERENCES

"Everybody's Cookbook," by Lord; revised edition, Harcourt, Brace and Company, New York, pages 269 and 807.